US009936416B2

(12) United States Patent
Li et al.

(10) Patent No.: US 9,936,416 B2
(45) Date of Patent: Apr. 3, 2018

(54) METHOD FOR CONTROLLING NETWORK TRANSMISSION DELAY, QOS CONTROL ENTITY AND COMMUNICATION DEVICE

(71) Applicant: HUAWEI TECHNOLOGIES CO., LTD., Shenzhen (CN)

(72) Inventors: Yan Li, Beijing (CN); Wenfu Wu, Shanghai (CN); Kai Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 14/640,292

(22) Filed: Mar. 6, 2015

(65) Prior Publication Data
US 2015/0189539 A1 Jul. 2, 2015

Related U.S. Application Data

(63) Continuation of application No. PCT/CN2012/081053, filed on Sep. 6, 2012.

(51) Int. Cl.
*H04W 28/02* (2009.01)
*H04W 28/24* (2009.01)
(Continued)

(52) U.S. Cl.
CPC ..... *H04W 28/0236* (2013.01); *H04L 41/0893* (2013.01); *H04L 41/5025* (2013.01);
(Continued)

(58) Field of Classification Search
CPC ........... H04W 28/0236; H04L 43/0852; H04L 47/283
See application file for complete search history.

(56) References Cited

U.S. PATENT DOCUMENTS

2003/0198204 A1\* 10/2003 Taneja .................... H04L 5/023
370/332
2004/0248583 A1 12/2004 Satt et al.
(Continued)

FOREIGN PATENT DOCUMENTS

CN 101103601 1/2008
CN 101119314 2/2008
(Continued)

OTHER PUBLICATIONS

Search Report dated Sep. 16, 2015 in corresponding Chinese Patent Application No. 2012800013814.
(Continued)

Primary Examiner — Hashim Bhatti
(74) Attorney, Agent, or Firm — Staas & Halsey LLP

(57) ABSTRACT

A method for controlling network transmission delay, a QoS control entity, and a communication device are disclosed. In the method for controlling network transmission delay, the QoS control entity, and the communication device in the embodiments of the present invention, a service flow delay threshold is set to monitor the network transmission delay, and, when it is determined that the service flow transmission delay requirement is not met, a delay control policy is formulated to adjust the network transmission delay dynamically, thereby improving user experience.

3 Claims, 9 Drawing Sheets

(51) Int. Cl.
  *H04L 12/841* (2013.01)
  *H04L 29/06* (2006.01)
  *H04L 12/24* (2006.01)
  *H04L 12/853* (2013.01)
  *H04L 12/26* (2006.01)
  *H04L 12/801* (2013.01)

(52) U.S. Cl.
  CPC .......... *H04L 43/0852* (2013.01); *H04L 43/16* (2013.01); *H04L 47/2416* (2013.01); *H04L 47/283* (2013.01); *H04L 47/33* (2013.01); *H04L 65/4084* (2013.01); *H04L 65/80* (2013.01); *H04W 28/0268* (2013.01); *H04W 28/24* (2013.01); *H04L 47/34* (2013.01)

(56) References Cited

U.S. PATENT DOCUMENTS

| | | | |
|---|---|---|---|
| 2005/0169171 A1* | 8/2005 | Cheng | H04L 47/10 370/229 |
| 2006/0285489 A1* | 12/2006 | Francisco | H04L 12/2859 370/229 |
| 2008/0095055 A1 | 4/2008 | Moulsley et al. | |
| 2008/0191285 A1 | 8/2008 | Ko et al. | |
| 2008/0228932 A1 | 9/2008 | Monette et al. | |
| 2009/0193147 A1* | 7/2009 | Lepeska | H04L 67/101 709/241 |
| 2011/0019542 A1 | 1/2011 | Bernstein et al. | |
| 2013/0133041 A1* | 5/2013 | Magyar | H04L 63/10 726/4 |

FOREIGN PATENT DOCUMENTS

| | | |
|---|---|---|
| CN | 101241912 | 8/2008 |
| CN | 101778426 | 7/2010 |
| WO | 2011/104306 A1 | 9/2011 |

OTHER PUBLICATIONS

Office Action dated Sep. 25, 2015 in corresponding Chinese Patent Application No. 201280001381.4.

International search Report dated Jun. 13, 2013 in corresponding international application PCT/CN2012/081053.

PCT International Search Report dated Jun. 13, 2013 in corresponding International Patent Application No. PCT/CN2012/081053.

"3rd Generation Partnership Project; Technical Specification Group Services and System Aspects; Policy and charging control architecture (Release 11)", 3GPP TS 23.203 V11.6.0, Jun. 2012, pp. 1-177.

Extended European Search Report dated Aug. 5, 2015 in corresponding European Patent Application No. 12884236.6.

* cited by examiner

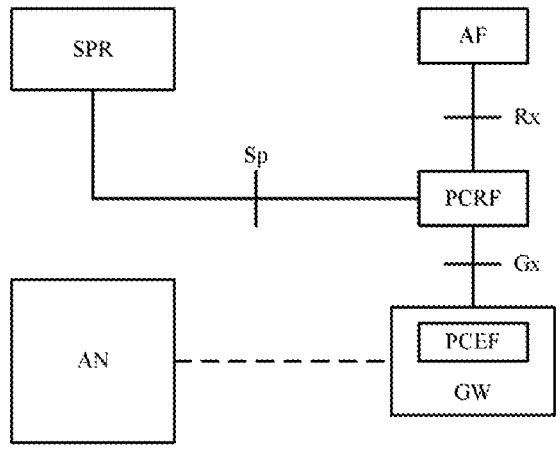

S110: Send a service flow delay threshold to a communication device according to a transmission delay requirement of a service flow, where the communication device includes a network device and/or a user equipment S120: Receive a delay threshold exceeding indication sent by the communication device, where the delay threshold exceeding indication is used to indicate that a transmission delay of the service flow exceeds the service flow delay threshold S130: Determine a delay control policy according to the delay threshold exceeding indication, so that the network element that receives the delay control policy executes the delay control policy

Determine the service content buffering policy as the delay control policy according to the delay threshold exceeding indication when the network device has a buffering capability ～ S132

Send a service content buffering indication to the network device according to the service content buffering policy, where the service content buffering indication is used to instruct the network device to pre-buffer a service content carried in the service flow, whereupon the network device transmits the service content to the user equipment ～ S150

FIG. 5

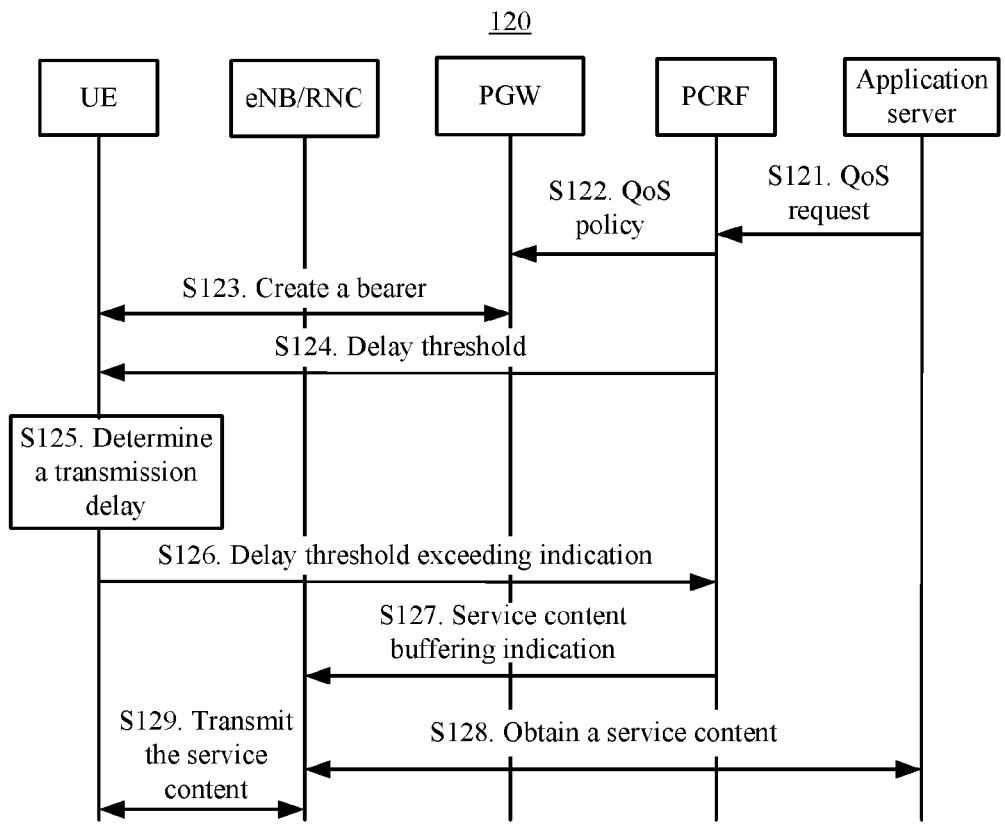

┌─────────────────────────────────────────────────────────┐
│ Determine the QoS update policy as the delay control policy │
│ according to the delay threshold exceeding indication when a │
│ network that includes the service flow can meet the transmission │ ~ S135
│ delay requirement │
└─────────────────────────────────────────────────────────┘
                              ↓
┌─────────────────────────────────────────────────────────┐
│ Send a QoS update indication to the network device according to │
│ the QoS update policy, where the QoS update indication is used to │ ~ S170
│ instruct the network device to update a QoS type identifier in the │
│ QoS policy │
└─────────────────────────────────────────────────────────┘

FIG. 9

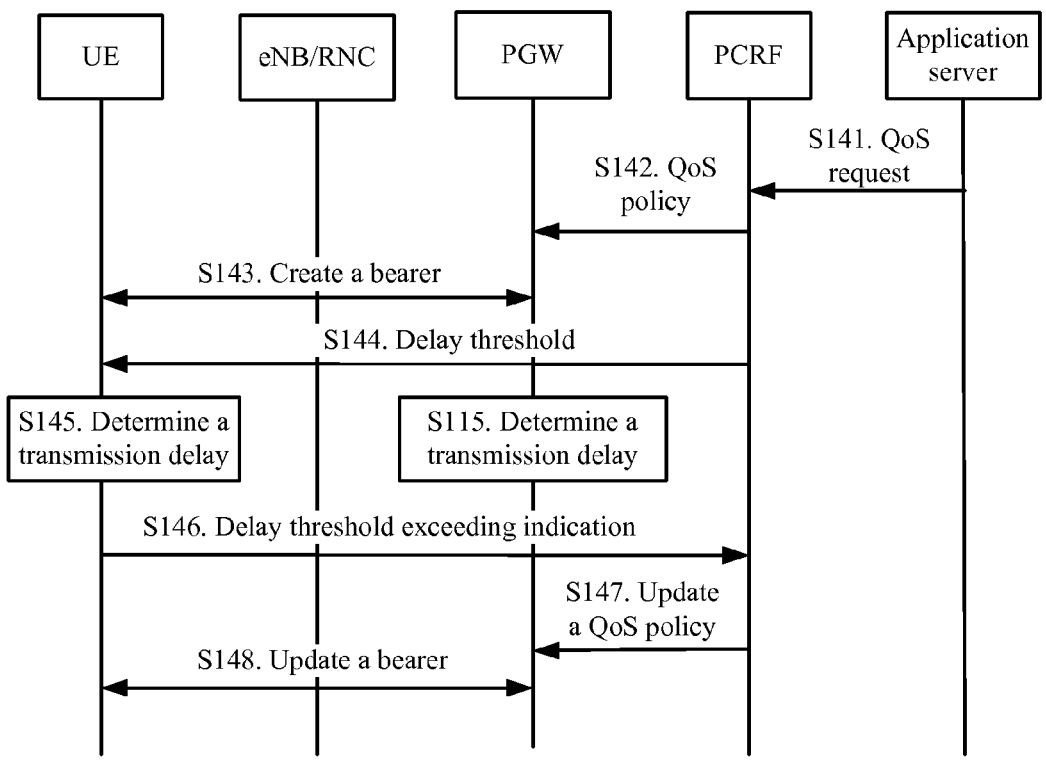

FIG. 10

METHOD FOR CONTROLLING NETWORK TRANSMISSION DELAY, QOS CONTROL ENTITY AND COMMUNICATION DEVICE

CROSS-REFERENCE TO RELATED APPLICATIONS

This application is a continuation of International Application No. PCT/CN2012/081053, filed on Sep. 6, 2012, which is hereby incorporated by reference in its entirety.

TECHNICAL FIELD

Embodiments of the present invention relate to the communications field, and in particular, to a method for controlling network transmission delay, a QoS control entity, and a communication device.

BACKGROUND

Communication networks are evolving from circuit switching (Circuit Switching, "CS" for short) networks to packet switching (Packet Switching, "PS" for short) networks over the Internet Protocol (Internet Protocol, "IP" for short). In carrier-class services provided by the IP network, it is essential to consider end-to-end quality of service (Quality of Service, "QoS" for short) to meet communication quality requirements of the user, especially in real-time services such as video calls and online games. In view of the QoS requirements of the service, the $3^{rd}$ Generation Partnership Project (3rd Generation Partnership Project, "3GPP" for short) defines a policy and charging control (Policy and Charging Control, "PCC" for short) architecture.

In a PCC architecture, to meet the QoS requirements of specific service flows, the following procedure is generally applied: An application function (Application Function, "AF" for short) entity sends an authentication authorization request (Authentication Authorization Request, "AAR" for short) message to a policy control and charging rule function (Policy control and Charging Rule Function, "PCRF" for short) entity, where the AAR message may carry service information such as the IP address, the port number and the media type of an IP flow, and the corresponding QoS requirement such as bandwidth information; the PCRF stores received service information, and generates and stores a new PCC rule according to service information, subscription information, operator configuration, and other information received from a policy and charging enforcement function (Policy and Charging Enforcement Function, "PCEF") and the AF; the PCRF sends a re-authorization request (Re-Authorization Request, "RAR" for short) message to the PCEF, where the RAR message carries new PCC rule; the PCEF loads and executes the PCC rule, and performs policy and charging control on the service data flow; if no IP-connectivity access network (IP-Connectivity Access Network, "IP-CAN" for short) bearer meets the QoS requirements in the PCC rule, a new IP-CAN bearer that meets the requirements is created between the PCEF and the access network, where the QoS class identifier (QoS Class Identifier, "QCI" for short) of the bearer is a QCI parameter in the PCC rule; the PCEF returns a re-authorization answer (Re-Authorization Answer, "RAA" for short) message to the PCRF; and the PCRF returns an authentication authorization answer (Authentication Authorization Answer, "AAA" for short) message to the AF. In this way, IP-CAN bearers of different QCI parameters are created to meet QoS requirements of different services.

The application layer is concerned with an end-to-end delay, that is, the delay from a user equipment (User Equipment, "UE" for short) to an application server. In the prior art, the PCRF generates the QCI in the QoS policy according to only the service type or the application layer delay requirement, but the QCI does not necessarily meet application layer requirements. For example, the delay upper limit of the application server is 120 ms, and the PCRF generates QCI=1, which corresponds to a delay of up to 100 ms. In fact, the delay from the application server to the PCEF is 40 ms. Therefore, QoS policy does not meet the application layer delay requirement.

In addition, once the QoS policy is generated, it is deemed that the network meets the application layer delay requirement. In fact, due to user mobility and the network state, it is possible that the initial QoS policy meets the delay requirement at the beginning but the network is unable to meet the transmission delay requirement of the service flow subsequently for reasons such as switching between access networks or congestion of radio resources, which leads to poor user experience.

SUMMARY

Embodiments of the present invention provide a method for controlling network transmission delay, a QoS control entity, and a communication device to reduce network transmission delay.

In a first aspect, an embodiment of the present invention provides a method for controlling network transmission delay, including: sending a service flow delay threshold to a communication device according to a transmission delay requirement of a service flow, where the communication device includes a network device and/or a user equipment; receiving a delay threshold exceeding indication sent by the communication device, where the delay threshold exceeding indication is used to indicate that a transmission delay of the service flow exceeds the service flow delay threshold; and determining a delay control policy according to the delay threshold exceeding indication, so that the communication device that sends the delay control policy executes the delay control policy.

In a first possible implementation of the first aspect, the delay control policy includes: a flow switching policy, an access technology switching policy, a service content buffering policy, or a Quality of Service QoS update policy.

With reference to the first aspect or the first possible implementation of the first aspect, in a second possible implementation, the determining a delay control policy according to the delay threshold exceeding indication includes: determining the flow switching policy as the delay control policy according to the delay threshold exceeding indication when the user equipment accesses at least two networks concurrently; and the method further includes: sending a flow switching indication to the user equipment according to the flow switching policy, where the flow switching indication is used to instruct the user equipment to switch the service flow from a currently accessed network to another network in the at least two networks.

With reference to the first aspect or the first possible implementation of the first aspect, in a third possible implementation, the determining a delay control policy according to the delay threshold exceeding indication includes: determining the service content buffering policy as the delay control policy according to the delay threshold exceeding indication when the network device has a buffering capability; and the method further includes: sending a service content buffering indication to the network device according to the service content buffering policy, where the service content buffering indication is used to instruct the network device to pre-buffer a service content carried in the service flow, whereupon the network device transmits the service content to the user equipment.

With reference to the first aspect or the first possible implementation of the first aspect, in a fourth possible implementation, the determining a delay control policy according to the delay threshold exceeding indication includes: determining an accessible network available in a location of the user equipment according to location information of the user equipment; and determining the access technology switching policy as the delay control policy according to the delay threshold exceeding indication; and the method further includes: sending an access technology switching indication to the user equipment according to the access technology switching policy, where the access technology switching indication is used to instruct the user equipment to access the accessible network.

With reference to the first aspect or the first possible implementation of the first aspect, in a fifth possible implementation, the determining a delay control policy according to the delay threshold exceeding indication includes: determining the QoS update policy as the delay control policy according to the delay threshold exceeding indication when a network that includes the service flow can meet the transmission delay requirement; and the method further includes: sending a QoS update indication to the network device according to the QoS update policy, where the QoS update indication is used to instruct the network device to update a QoS type identifier in the QoS policy.

With reference to the first aspect or any one of the first to fifth possible implementations of the first aspect, in a sixth possible implementation, the sending a service flow delay threshold to a communication device according to a transmission delay requirement of a service flow includes: sending the service flow delay threshold to the communication device according to the transmission delay requirement of the service flow, where the service flow delay threshold is a delay of the service content carried in the service flow from the application server to the user equipment as required by the application server.

In a second aspect, an embodiment of the present invention provides a method for controlling network transmission delay, including: receiving a service flow delay threshold sent by a Quality of Service QoS control entity; determining a service flow transmission delay corresponding to the service flow delay threshold; and sending a delay threshold exceeding indication to the QoS control entity when the service flow transmission delay exceeds the service flow delay threshold, so that the QoS control entity determines a delay control policy according to the delay threshold exceeding indication.

In a first possible implementation of the second aspect, the method further includes: receiving the delay control policy sent by the QoS control entity; and controlling the service flow transmission delay according to the delay control policy.

With reference to the second aspect or the first possible implementation of the second aspect, in a second possible implementation, the receiving a service flow delay threshold sent by a Quality of Service QoS control entity includes: receiving the service flow delay threshold sent by the QoS control entity, where the service flow delay threshold is a delay of the service content carried in the service flow from an application server to a user equipment as required by the application server.

With reference to the second aspect or the first or second possible implementation of the second aspect, in a third possible implementation, the delay control policy includes: a flow switching policy, an access technology switching policy, a service content buffering policy, or a Quality of Service QoS update policy.

In a third aspect, an embodiment of the present invention provides a QoS control entity, including: a first sending module, configured to send a service flow delay threshold to a communication device according to a transmission delay requirement of a service flow, where the communication device includes a network device and/or a user equipment; a receiving module, configured to receive a delay threshold exceeding indication sent by the communication device, where the delay threshold exceeding indication is used to indicate that a transmission delay of the service flow exceeds the service flow delay threshold sent by the first sending module; and a determining module, configured to determine a delay control policy according to the delay threshold exceeding indication received by the receiving module, so that the communication device that sends the delay control policy executes the delay control policy.

In a first possible implementation of the third aspect, the delay control policy determined by the determining module includes: a flow switching policy, an access technology switching policy, a service content buffering policy, or a Quality of Service QoS update policy.

With reference to the third aspect or the first possible implementation of the third aspect, in a second possible implementation, the determining module includes: a first determining unit, configured to determine the flow switching policy as the delay control policy according to the delay threshold exceeding indication when the user equipment accesses at least two networks concurrently, where the indication is received by the receiving module; and the QoS control entity further includes: a second sending module, configured to send a flow switching indication to the user equipment according to the flow switching policy determined by the first determining unit, where the flow switching indication is used to instruct the user equipment to switch the service flow from a currently accessed network to another network in the at least two networks.

With reference to the third aspect or the first possible implementation of the third aspect, in a third possible implementation, the determining module includes: a second determining unit, configured to determine the service content buffering policy as the delay control policy according to the delay threshold exceeding indication when the network device has a buffering capability, where the indication is received by the receiving module; the QoS control entity further includes: a third sending module, configured to send a service content buffering indication to the network device according to the service content buffering policy determined by the second determining unit, where the service content buffering indication is used to instruct the network device to pre-buffer a service content carried in the service flow, whereupon the network device transmits the service content to the user equipment.

With reference to the third aspect or the first possible implementation of the third aspect, in a fourth possible implementation, the determining module includes: a third determining unit, configured to determine an accessible network available in a location of the user equipment according to location information of the user equipment; and a fourth determining unit, configured to determine the access technology switching policy as the delay control policy according to the delay threshold exceeding indication, where the indication is received by the receiving module; and the QoS control entity further includes: a fourth sending module, configured to send an access technology switching indication to the user equipment according to the access technology switching policy determined by the fourth determining unit, where the access technology switching indication is used to instruct the user equipment to access the accessible network determined by the third determining unit.

With reference to the third aspect or the first possible implementation of the third aspect, in a fifth possible implementation, the determining module includes: a fifth determining unit, configured to determine the QoS update policy as the delay control policy according to the delay threshold exceeding indication when a network that includes the service flow can meet the transmission delay requirement, where the indication is received by the receiving module; and the QoS control entity further includes: a fifth sending module, configured to send a QoS update indication to the network device according to the QoS update policy determined by the fifth determining unit, where the QoS update indication is used to instruct the network device to update a QoS type identifier in the QoS policy.

With reference to the third aspect or any one of the first to fifth possible implementations of the third aspect, in a sixth possible implementation, the first sending module is specifically configured to send the service flow delay threshold to the communication device according to the transmission delay requirement of the service flow, where the service flow delay threshold is a delay of the service content carried in the service flow from the application server to the user equipment as required by the application server.

In a fourth aspect, an embodiment of the present invention provides a communication device, including: a first receiving module, configured to receive a service flow delay threshold sent by a Quality of Service QoS control entity; a determining module, configured to determine a service flow transmission delay corresponding to the service flow delay threshold received by the first receiving module; and a sending module, configured to send a delay threshold exceeding indication to the QoS control entity when the service flow transmission delay determined by the determining module exceeds the service flow delay threshold received by the first receiving module, so that the QoS control entity determines a delay control policy according to the delay threshold exceeding indication.

In a first possible implementation of the fourth aspect, the communication device further includes: a second receiving module, configured to receive the delay control policy sent by the QoS control entity; and a controlling module, configured to control the service flow transmission delay according to the delay control policy received by the second receiving module.

With reference to the fourth aspect or the first possible implementation of the fourth aspect, in a second possible implementation, the first receiving module is specifically configured to receive the service flow delay threshold sent by the QoS control entity, where the service flow delay threshold is a delay of the service content carried in the service flow from an application server to a user equipment as required by the application server.

With reference to the fourth aspect or the first or second possible implementation of the fourth aspect, in a third possible implementation, the delay control policy received by the second receiving module includes: a flow switching policy, an access technology switching policy, a service content buffering policy, or a Quality of Service QoS update policy.

Based on the foregoing technical solutions, in the method for controlling network transmission delay, the QoS control entity, and the communication device in the embodiments of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

BRIEF DESCRIPTION OF DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 shows a schematic architecture of an application scenario according to an embodiment of the present invention;

FIG. 2 is a schematic flowchart of a method for controlling network transmission delay according to an embodiment of the present invention;

FIG. 5 is still another schematic flowchart of a method for controlling network transmission delay according to an embodiment of the present invention;

FIG. 6 is a schematic flowchart of a method for controlling network transmission delay by using a service content buffering policy according to an embodiment of the present invention;

FIG. 9 is still another schematic flowchart of a method for controlling network transmission delay according to an embodiment of the present invention;

FIG. 10 is a schematic flowchart of a method for controlling network transmission delay by using a QoS update policy according to an embodiment of the present invention;

DESCRIPTION OF EMBODIMENTS

Figures 3, 4:
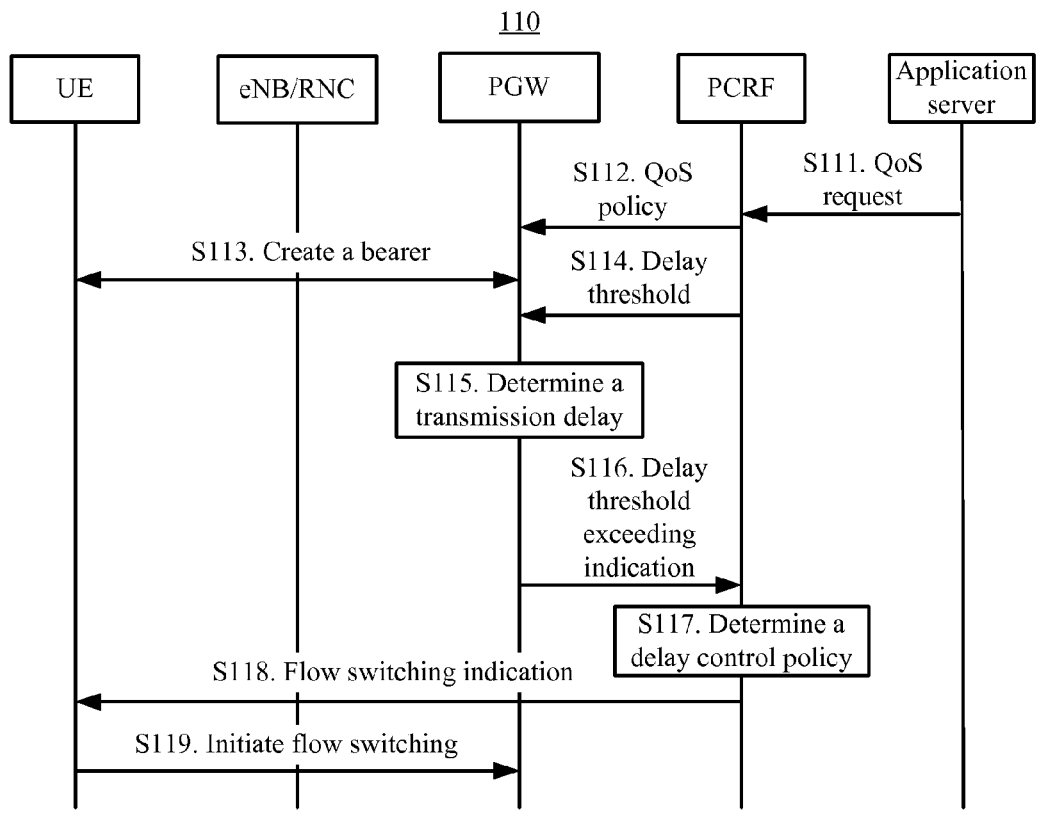
FIG. 3 is another schematic flowchart of a method for controlling network transmission delay according to an embodiment of the present invention.
FIG. 4 is a schematic flowchart of a method for controlling network transmission delay by using a flow switching policy according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to various communications systems, such as a Global System for Mobile communication (Global System for Mobile communication, GSM for short) system, a Code Division Multiple Access (Code Division Multiple Access, CDMA for short) system, a Wideband Code Division Multiple Access (Wideband Code Division Multiple Access, WCDMA for short) system, a General Packet Radio Service (General Packet Radio Service, GPRS for short) system, a Long Term Evolution (Long Term Evolution, LTE for short) system, a LTE Frequency Division Duplex (Frequency Division Duplex, FDD for short) system, a LTE Time Division Duplex (Time Division Duplex, TDD for short) system, a Universal Mobile Telecommunication System (Universal Mobile Telecommunication System, UMTS for short), and a Worldwide Interoperability for Microwave Access (Worldwide Interoperability for Microwave Access, WiMAX for short) communications system.

It should be further understood that the user equipment (User Equipment, UE for short) in the embodiments of the present invention is also known as UE (UE), mobile station (Mobile Station, MS for short), mobile UE (Mobile UE), and so on; and may communicate with one or more core networks through a radio access network (Radio Access Network, RAN for short). For example, the user equipment may be a mobile phone (or called a "cellular" phone), or a computer with a mobile UE, such as a mobile device that is portable, pocket-sized, handheld, built in a computer, or set in a vehicle. They exchanges voice and/or data with the radio access network.

In the embodiments of the present invention, a base station may be a base transceiver station (Base Transceiver Station, BTS for short) in a GSM or CDMA system, or a NodeB (NodeB, NB for short) in a WCDMA system, or an evolved NodeB NodeB, eNB or e-NodeB for short) in an LTE system. The present invention does not limit the type of the base station.

It should be understood that in the embodiments of the present invention, the term "system" is usually exchangeable with the term "network" herein. The term "and/or" herein denotes only an association relationship between associated objects, and represents three possible relationships. For example, "A and/or B" may represent the following three cases: A alone, both A and B, and B alone. In addition, a character "/" herein generally means that an object before the character and an associated object after the character are in an "or" relationship.

FIG. 1 shows a schematic architecture of an application scenario according to an embodiment of the present invention. As shown in FIG. 1, in the PCC framework, according to limitations imposed on the user access to the network, operator policies, subscription data, information about a ongoing service of the user, and so on, the policy control and charging rule function PCRF entity decides the policies to be executed, and delivers the policies to a PCEF, and the PCEF executes the policies. The policies include a QoS policy, which requires that the delay and/or bandwidth requirements of a specific service should be met. By executing the policies delivered by the PCRF, the policy and charging enforcement function PCEF entity implements detection of the service data flow, and implements QoS assurance for the specific service data flow. The PCEF entity is generally based on a gateway (Gateway, "GW" for short), and can be connected to multiple networks of different access technologies. A subscription profile repository (Subscription Profile Repository, "SPR" for short) provides the PCRF with subscription data. An application function AF entity provides the PCRF with application layer session information dynamically, and the PCRF generates or modifies the corresponding policy dynamically according to the information.

In the PCC architecture shown in FIG. 1, the Gx reference point connects the PCEF and the PCRF, and is used by the PCEF to request a PCC rule from the PCRF and used by the PCRF to deliver the PCC rule to the PCEF; the Rx reference point connects the AF and the PCRF, and is used by the AF to deliver application layer related information, where the information includes an IP filter used to identify the service data flow, information about the bandwidth required by the application or media, and so on; and the Sp reference point connects the SPR and the PCRF, and is used by the PCRF to request subscription information from the SPR, where the subscription information is used to determine the IP-CAN transmission layer policy.

FIG. 2 shows a method 100 for controlling network transmission delay according to an embodiment of the present invention. The method 100 may be executed by a QoS control entity such as a PCRF. As shown in FIG. 2, the method 100 includes the following steps:

S110. Send a service flow delay threshold to a communication device according to a transmission delay requirement of a service flow, where the communication device includes a network device and/or a user equipment.

S120. Receive a delay threshold exceeding indication sent by the communication device, where the delay threshold exceeding indication is used to indicate that a transmission delay of the service flow exceeds the service flow delay threshold.

S130. Determine a delay control policy according to the delay threshold exceeding indication, so that the communication device that sends the delay control policy executes the delay control policy.

The QoS control entity may send a service flow delay threshold to the communication device according to the service flow transmission delay requirement, so that the communication device can detect whether the service flow transmission delay meets requirements according to the service flow delay threshold, and therefore, when the service flow transmission delay exceeds the service flow delay threshold, the QoS control entity determines a delay control policy according to a delay threshold exceeding indication received from the communication device. In this way, the communication device that sends the delay control policy can execute the delay control policy conveniently, and the network transmission delay is reduced.

Therefore, in the method for controlling network transmission delay in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

In each embodiment of the present invention, the QoS control entity may be a PCRF, such as a PCRF in the PCC architecture shown in FIG. 1, or may be an open capability platform or a service development platform of the operator; and the QoS control entity may also be another open platform. For ease of description in the embodiment of the present invention, it is assumed that the QoS control entity is a PCRF, which, however, shall not be construed as any limitation on the present invention.

In the embodiment of the present invention, the application server may be a video server or a File Transfer Protocol (File Transfer Protocol, "FTP" for short) server. The FTP server serves the special purpose of providing various files for the user. The FTP server generally stores plenty of files such as software, MP3, movies, programs, and so on. The application server may also be an email server or another server, which shall not be construed as any limitation on the present invention. In addition, in the embodiment of the present invention, the application service or the service content may be a video, software, MP3, a movie, a program, or an email content, which shall not be construed as any limitation on the present invention.

It should be understood that in each embodiment of the present invention, if the QoS control entity in the present invention is a PCRF, the interaction between the application server and the QoS control entity may be implemented on an open platform. For example, the application server sends a QoS request to an open platform, requesting to configure a QoS policy for the service, and the open platform sends the QoS request to the QoS control entity, so as to configure the QoS policy of the service.

It should be further understood that in each embodiment of the present invention, information may be transmitted through a message interface between function entities or communication devices, or through an application programming interface (Application Programming Interface, "API" for short), or through another type of interface or by other means, which shall not be construed as any limitation on the present invention.

It should be further understood that in each embodiment of the present invention, the terms "request", "answer", "response", and so on, are merely intended to denote a carrier of information or content, such as a message, and the specific name shall not be construed as a limitation. In addition, the terms "answer" or "response" is not necessarily a response or answer to the "request", but may denote certain information or content, or denote a carrier of certain information or content, such as a message, which shall not be construed as any limitation on the embodiment of the present invention.

In S110, the QoS control entity sends a service flow delay threshold to a communication device according to a transmission delay requirement of a service flow, where the communication device includes a network device and/or a user equipment.

In the embodiment of the present invention, optionally, the service flow delay threshold is a delay of the service content carried in the service flow from an application server to a user equipment as required by the application server, that is, an end-to-end delay. For example, if the application server requires an end-to-end delay of 100 ms, the service flow delay threshold may be set to 100 ms.

It should be understood that in the embodiment of the present invention, the service flow delay threshold set by the QoS control entity may also be less than an end-to-end delay required by the application server. For example, for services that require very high real-timeness or high-priority services, the QoS control entity may set the service flow delay threshold to 90 ms, so that a possible failure of meeting the service flow transmission delay requirement can be detected in time. In this way, the QoS control entity can set a delay control policy to reduce network transmission delay, ensure a proper transmission delay of the service, and improve user experience.

In addition, in the embodiment of the present invention, the service flow delay threshold set by the QoS control entity may also be greater than the end-to-end delay required by the application server. For example, for services that do not require high real-timeness or low-priority services, the QoS control entity may set the service flow delay threshold to 110 ms, so as to reduce system resource consumption and improve system resource usage while the service flow transmission delay is met as far as possible.

In the embodiment of the present invention, the communication device may be any network device capable of detecting the service flow transmission delay on a transmission path of the service flow. For example, the network device may be a packet data network gateway (PDN Gateway, "PGW" for short, where Packet Data Network (packet data network) is abbreviated as "PDN"), a radio base station, and so on; and the communication device may be a user equipment UE. That is, in the embodiment of the present invention, the QoS control entity may send the service flow delay threshold to the network device, or may send the service flow delay threshold to the user equipment.

In S120, the QoS control entity receives a delay threshold exceeding indication sent by the communication device, where the delay threshold exceeding indication is used to indicate that a transmission delay of the service flow exceeds the service flow delay threshold.

After receiving the delay threshold exceeding indication, the QoS control entity knows that the current QoS policy no longer meet the end-to-end delay required by the service flow, and therefore, the QoS control entity may formulate a delay control policy to reduce the network transmission delay. The QoS control entity may receive the delay threshold exceeding indication from the communication device by means of a message or an API interface or by other means.

In S130, the QoS control entity determines a delay control policy according to the delay threshold exceeding indication, so that the communication device that sends the delay control policy executes the delay control policy.

In the embodiment of the present invention, the delay control policy is used to reduce the network transmission delay, meet the end-to-end delay requirements of the service flow as far as possible, and improve user experience. Optionally, the delay control policy includes: a flow switching policy, an access technology switching policy, a service content buffering policy, or a Quality of Service QoS update policy.

Therefore, in the method for controlling network transmission delay in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

The following describes how a QoS control entity uses a specific delay control policy to control the network transmission delay with reference to FIG. 3 to FIG. 10.

As shown in FIG. 3, in the method 100 for controlling network transmission delay according to the embodiment of the present invention, optionally, the determining, by the QoS control entity, a delay control policy according to the delay threshold exceeding indication, includes the following step:

S131. Determine the flow switching policy as the delay control policy according to the delay threshold exceeding indication when the user equipment accesses at least two networks concurrently.

The method 100 further includes the following step:

S140. Send a flow switching indication to the user equipment according to the flow switching policy, where the flow switching indication is used to instruct the user equipment to switch the service flow from a currently accessed network to another network in the at least two networks.

It should be understood that in the embodiment of the present invention, the communication device for executing the delay control policy is a user equipment.

It should be understood that in the embodiment of the present invention, the term "stream switching" refers to a switching technology that, without changing transmission of other service flows, switches a specific service flow from a current access network to another access network when one of two access networks such as a WiFi network and a 3G network concurrently accessed by a UE is congested. The term "access technology switching" refers to an access technology that, for a UE that can access only one access network at a time, interrupts the connection from the current access network and creates a connection to another access network when the current access network is congested. In this case, not only the current service flow is switched over to the new access network, but also all other service flows are switched over.

Therefore, if the QoS control entity determines that the service flow transmission delay requirement is not met, in the case that the user equipment accesses at least two networks concurrently, a flow switching indication is sent to the user equipment so that the service flow is switched from the currently accessed network to the other one of the at least two networks to reduce the network transmission delay and improve user experience.

The following describes the foregoing embodiments in detail with reference to FIG. 4. In the application scenario shown in FIG. 4, it is assumed that the user equipment UE is connected to two access networks of different technologies concurrently, where the two networks are a wireless local area network (Wireless Local Area Networks, "WLAN" for short) and a universal mobile telecommunications system) terrestrial radio access network (UMTS Terrestrial Radio Access Network, "UTRAN" for short, where the Universal Mobile Telecommunications System (universal mobile telecommunications system) is abbreviated as UMTS). At the beginning, the user equipment is connected to the application server through the UTRAN.

The method 110 for controlling network transmission delay by using a flow switching policy according to an embodiment of the present invention includes the following steps:

S111. The application server may send a QoS request to the QoS control entity, that is, the PCRF, so as to request service flow QoS requirements, which include delay and/or bandwidth, and so on. The QoS request further includes service information related to the service flow.

S112. The PCRF may obtain the end-to-end (from the UE to the application server) delay requirement of the service flow according to the QoS request sent by the application server, and can therefore formulate a corresponding QoS policy that includes a QCI, and send the QoS policy to the PGW by means of API invoking or a message.

S113. The PGW creates an IP-CAN bearer between the PGW and the UE according to the received QoS policy, where the delay of the IP-CAN bearer can meet the QCI requirement.

S114. The QoS control entity, that is, the PCRF, sends a service flow identifier and a service flow delay threshold corresponding to the service flow identifier to the PGW by means of a message or API invoking, so as to subscribe to the delay change specific to a service flow. Optionally, the service flow delay threshold is an end-to-end delay required by the application server in S111.

S115. The PGW detects the delay of the specific service flow.

It should be understood that a feasible method is: The PGW records a sequence number in a Transmission Control Protocol (Transmission Control Protocol, "TCP" for short) packet sent to the application server and current time T1, and, after receiving a TCP response packet sequence number from the application server, records the current time T2 and obtains the delay from the PGW to the application server according to (T2−T1)/2. Similarly, the PGW may record a sequence number in a TCP packet sent to the UE and current time T3, and, after receiving a TCP response packet sequence number from the UE, record the current time T4, and obtain the delay from the PGW to the UE according to (T4−T3)/2 and therefore obtain the end-to-end delay from the user equipment to the server. To ensure reliability, the PGW may detect the round-trip time of multiple TCP packets, and use their average value as a transmission delay.

S116. When the transmission delay detected by the PGW exceeds the service flow delay threshold specified by the QoS control entity, that is, after the RNC radio resources are congested, the PGW may use an API or message to send a delay threshold exceeding indication to the QoS control entity PCRF.

S117. After receiving the delay threshold exceeding indication, the PCRF knows that the current QoS policy is unable to meet the end-to-end delay requirement, and therefore, the QoS control entity, that is, the PCRF, may formulate another delay control policy to reduce the transmission delay. In this embodiment, because the UE accesses the WLAN network and the UTRAN network concurrently and the delay threshold exceeding is caused by congestion of the UTRAN, the QoS control entity may determine that the applied delay control policy is a flow switching policy, and switch the current service flow to the WLAN network to reduce the transmission delay.

S118. The PCRF sends a flow switching indication to the UE by means of API invoking or a message, where the flow switching indication may include a service flow identifier of the service flow.

S119. The UE may initiate a flow switching procedure to switch the service flow from the UTRAN network to the WLAN network, so as to reduce transmission delay and improve user experience.

It should be understood that in various embodiments of the present invention, the sequence number of each process does not represent order of implementation, and the order of implementing the processes depends on their functions and inherent logic, and shall not constitute any limitation on the implementation process of the embodiments of the present invention. For example, in the embodiment shown in FIG. 4, S112 may be combined with S114. That is, one message or API may be used to send both a QoS policy specific to the service flow and a service flow delay threshold specific to the service flow, which shall not be construed as any limitation on the present invention.

It should be further understood that in the embodiment shown in FIG. 4, the PCRF subscribes to the service flow delay change from the PGW, but in fact, the PCRF may subscribe to the delay change from any network device capable of detecting the service flow transmission delay on any transmission path of the service flow. For example, the PCRF may subscribe to the service flow delay change from a radio base station. Although the example is given here for ease of description, the present invention is not limited to the example.

Therefore, in the method for controlling network transmission delay in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

FIG. 5 is still another schematic flowchart of a method 100 for controlling network transmission delay according to the embodiment of the present invention. As shown in FIG. 5, optionally, the determining, by the QoS control entity, a delay control policy according to the delay threshold exceeding indication, includes the following step:

S132. Determine the service content buffering policy as the delay control policy according to the delay threshold exceeding indication when the network device has a buffering capability.

The method 100 further includes the following step:

S150. Send a service content buffering indication to the network device according to the service content buffering policy, where the service content buffering indication is used to instruct the network device to pre-buffer a service content carried in the service flow, whereupon the network device transmits the service content to the user equipment.

It should be understood that in the embodiment of the present invention, the communication device that executes the delay control policy is a network device, and the network device may be an eNB, or a radio network controller (Radio Network Controller, "RNC" for short), or another network device, which shall not be construed as any limitation on the present invention.

Specifically, as shown in FIG. 6, assuming that the UE accesses the network through an eUTRAN/UTRAN, and the eNB/RNC has a buffering capability and can retrieve a packet from the application server beforehand and buffer the packet locally, the method 120 for controlling network transmission delay by using a service content buffering policy according to an embodiment of the present invention may include the following steps:

S121. The application server sends a QoS request to the PCRF.

S122. The PCRF sends a QoS policy to the PGW.

S123. The PGW creates an IP-CAN bearer with the UE.

S124. The QoS control entity, that is, the PCRF, may send a service flow identifier and a service flow delay threshold to the UE by means of a message or API invoking, so as to subscribe to the delay change specific to a service flow from the UE. Optionally, the service flow delay threshold may be an end-to-end delay required by the application server in S121.

S125. The UE detects the delay of the specific service flow, and the detection may be performed in many ways. For example, the UE may perform estimation according to a TCP protocol delay or according to a Real-time Transport Control Protocol (Real-time Transport Control Protocol, "RTCP") timestamp.

S126. When detecting that the delay exceeds the service flow delay threshold specified by the QoS control entity, the UE may send a delay threshold exceeding indication to the QoS control entity PCRF by using an API or a message. In this embodiment, the reason that the delay exceeds the service flow delay threshold specified by the QoS control entity may be quality deterioration of the radio channel between the UE and the eNB/RNC.

S127. After receiving the delay threshold exceeding indication, the PCRF knows that the current QoS policy no longer meets the end-to-end delay requirement, and therefore, the PCRF may formulate another delay control policy to reduce the transmission delay. In this embodiment, because the eNB/RNC has a buffering capability and the current service (such as a video-on-demand service) may be implemented by means of pre-fetch, the PCRF determines that the delay control policy is a service content buffering policy, and uses an API or a message to instruct the eNB/RNC to buffer the service content over the service flow locally beforehand.

S128. The eNB/RNC obtains a service content from the application server to buffer the service content locally beforehand.

S129. The eNB/RNC transmits the buffered service content to the UE, so as to reduce the end-to-end transmission delay, that is, shorten the delay from the eNB to the application server, and therefore improve user experience.

It should be understood that S121, S122, and S123 in the embodiment of the present invention are the same as S111, S112, and S113 shown in FIG. 4 respectively, and, for brevity, are not detailed here any further.

It should be understood that in various embodiments of the present invention, the sequence number of each process does not represent order of implementation, and the order of implementing the processes depends on their functions and inherent logic, and shall not constitute any limitation on the implementation process of the embodiments of the present invention.

Therefore, in the method for controlling network transmission delay in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

Figure 7:
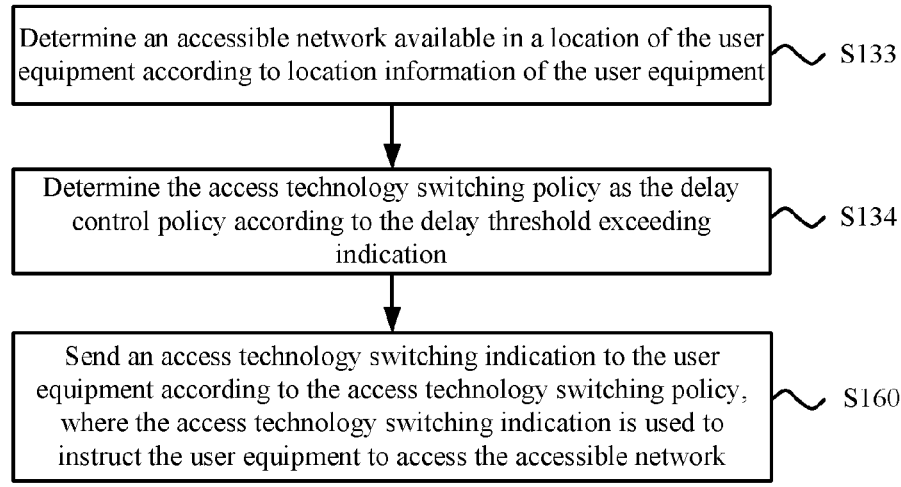
FIG. 7 is still another schematic flowchart of a method for controlling network transmission delay according to an embodiment of the present invention.

FIG. 7 is still another schematic flowchart of a method 100 for controlling network transmission delay according to the embodiment of the present invention. As shown in FIG. 7, optionally, the determining, by the QoS control entity, a delay control policy according to the delay threshold exceeding indication, includes the following steps:

S133. Determine an accessible network available in a location of the user equipment according to location information of the user equipment.

S134. Determine the access technology switching policy as the delay control policy according to the delay threshold exceeding indication.

The method 100 further includes the following step:

S160. Send an access technology switching indication to the user equipment according to the access technology switching policy, where the access technology switching indication is used to instruct the user equipment to access the accessible network.

That is, once the QoS control entity determines that an accessible network is available in the location of the user equipment according to the location information of the user equipment, the QoS control entity determines that the delay control policy is an access technology handover policy, and may send an access technology switching indication to the user equipment to instruct the user equipment to access the accessible network, thereby meeting the end-to-end delay requirement of the service flow as far as possible and improving user experience.

It should be understood that in the embodiment of the present invention, the communication device for executing the delay control policy is a user equipment.

Figure 8:
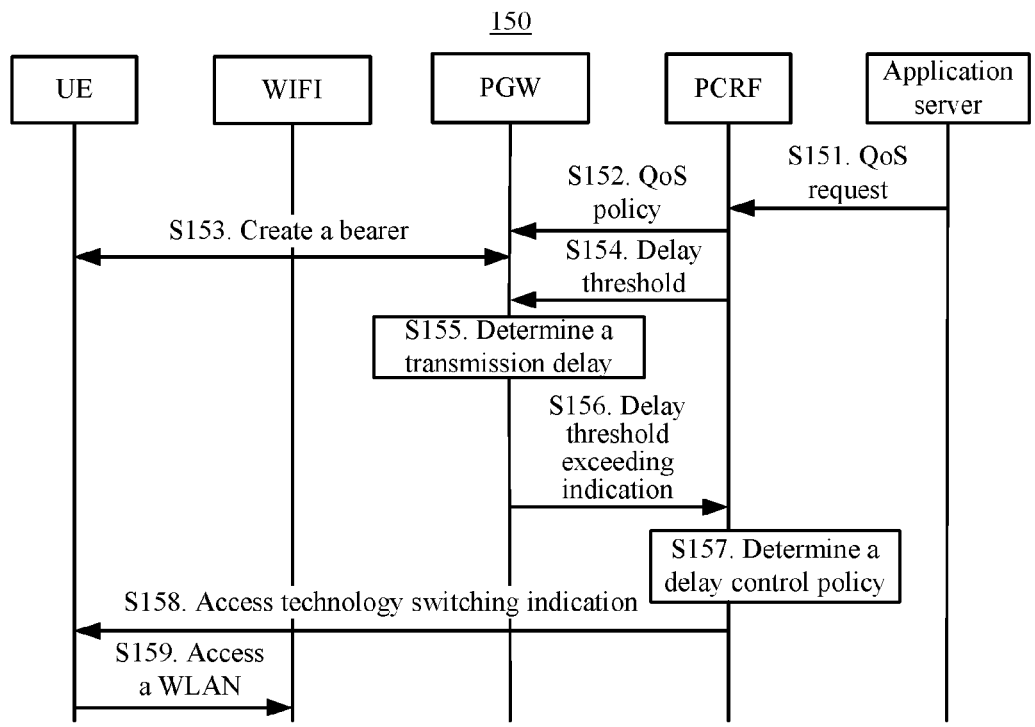
FIG. 8 is a schematic flowchart of a method for controlling network transmission delay by using an access technology switching policy according to an embodiment of the present invention.

Specifically, as shown in FIG. 8, assuming that the UE accesses the network through only an eUTRAN/UTRAN but another access technology such as WLAN is available in the location of the UE, the method 150 for controlling network transmission delay by using an access technology switching policy according to an embodiment of the present invention may include the following steps:

S151. The application server sends a QoS request to the PCRF.

S152. The PCRF sends a QoS policy to the PGW.

S153. The PGW creates an IP-CAN bearer with the UE.

S154. The PCRF sends a service flow delay threshold to the PGW.

S155. The PGW determines the transmission delay of the service flow.

S116. When the transmission delay detected by the PGW exceeds the service flow delay threshold specified by the QoS control entity, the PGW sends a delay threshold exceeding indication to the QoS control entity PCRF.

S157. After receiving the delay threshold exceeding indication, the QoS control entity, that is, the PCRF, knows that the current QoS policy no longer meets the end-to-end delay requirement, and therefore, the QoS control entity may formulate another delay control policy to reduce the transmission delay. In this embodiment, the QoS control entity may determine the access technology switching policy as the delay control policy if another accessible network different from the current access network is determined as being available in the position of the user equipment according to the location information of the UE.

S158. The QoS control entity, that is, the PCRF, may use an API or a message to send an access technology switching indication to the UE. For ease of switching, the message may include access-related information such as a service set identifier (Service Set Identifier, "SSID" for short) applied in the case of WLAN access.

S159. The UE accesses the WLAN network according to the access technology switching indication, and begins to transmit service packets under the WLAN access, so as to reduce the end-to-end delay and improve user experience.

It should be understood that S151 to S156 in the embodiment of the present invention are the same as S111 to S116 shown in FIG. 4 respectively, and, for brevity, are not detailed here any further.

It should be understood that in various embodiments of the present invention, the sequence number of each process does not represent order of implementation, and the order of implementing the processes depends on their functions and inherent logic, and shall not constitute any limitation on the implementation process of the embodiments of the present invention.

Therefore, in the method for controlling network transmission delay in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

FIG. 9 is still another schematic flowchart of a method 100 for controlling network transmission delay according to the embodiment of the present invention. As shown in FIG. 9, optionally, the determining, by the QoS control entity, a delay control policy according to the delay threshold exceeding indication, includes the following step:

S135. Determine the QoS update policy as the delay control policy according to the delay threshold exceeding indication when a network that includes the service flow can meet the transmission delay requirement.

The method 100 further includes the following step:

S170. Send a QoS update indication to the network device according to the QoS update policy, where the QoS update indication is used to instruct the network device to update a QoS type identifier in the QoS policy.

For example, when the QoS control entity generates the QoS policy initially, only the delay from the UE to the PGW is taken into account, which makes the QoS policy unable to meet the end-to-end delay requirement of the application server. For example, the application server requires a 160 ms delay, and the QoS control entity selects QCI=2 (the corresponding maximum delay from the PGW to the UE is 150 ms). However, the delay from the PGW to the application server is 20 ms, which is unable to meet the end-to-end delay requirement of the application server. In another example, when the transmission delay exceeds the service flow delay threshold which is not caused by radio congestion or access technology switching, if the QoS control entity determines that the network inclusive of the service flow can meet the transmission delay requirement, the QoS control entity can determine the QoS update policy as the delay control policy according to the delay threshold exceeding indication, thereby reducing the transmission delay and improving user equipment.

It should be understood that in the embodiment of the present invention, the communication device for executing the delay control policy is a network device such as a PGW.

Specifically, as shown in FIG. 10, assuming that the UE accesses the network through only an eUTRAN/UTRAN, the method 140 for controlling network transmission delay by using a QoS update policy according to an embodiment of the present invention may include the following steps:

S141. The application server sends a QoS request to the PCRF.

S142. The PCRF sends a QoS policy to the PGW.

S143. The PGW creates an IP-CAN bearer with the UE.

S144. The PCRF sends a service flow identifier and a service flow delay threshold to the UE.

S145. The UE detects the delay of the specific service flow.

S146. The QoS policy initially formulated by the QoS control entity takes account of only the delay from the UE to the PGW and is unable to meet the end-to-end delay requirement of the service flow; in this case, the delay detected in S145 will necessarily exceed the service flow delay threshold specified by the QoS control entity, and therefore, the UE may use an API or message to send a delay threshold exceeding indication to the PCRF.

S147. After receiving the delay threshold exceeding indication, the QoS control entity, that is, the PCRF, knows that the current QoS policy no longer meets the end-to-end delay requirement, and therefore, the QoS control entity may formulate another delay control policy to reduce the transmission delay. In this embodiment, the transmission delay exceeds the threshold which is not caused by radio congestion or access technology switching, the QoS control entity, that is, the PCRF, may change the QCI in the current QoS rule to reduce the network transmission delay, for example, change QCI=2 to QCI=1, and therefore, the QoS control entity, that is, the PCRF, can use an API or message to send a new QoS policy to the PGW.

S148. The PGW creates or updates an IP CAN bearer with the UE according to the updated QoS policy, and subsequent service flow packets are transmitted over the updated IP-CAN bearer, so as to reduce the network transmission delay and improve user experience.

It should be understood that S141 to S145 in the embodiment of the present invention are the same as S121 to S125 shown in FIG. 6 respectively, and, for brevity, are not detailed here any further.

It should be understood that in the embodiment of the present invention, the delay control policy determined by the QoS control entity according to the delay threshold exceeding indication may include: a flow switching policy, a service content buffering policy, an access technology switching policy, or a QoS update policy. Nevertheless, the QoS control entity may determine other delay control policies, and the embodiment of the present invention is not limited to the type of the delay control policy.

It should be further understood that in the embodiment of the present invention, when prerequisites of at least two of the flow switching policy, the service content buffering policy, the access technology switching policy, and the QoS update policy are met, the QoS control entity may determine an ultimate delay control policy according to other parameters. For example, when the user equipment accesses at least two networks concurrently and the network device has a buffering capability, if the delay threshold exceeding is caused by congestion of one of the at least two networks, the QoS control entity may determine to use a flow switching policy; and, if the delay threshold exceeding is not caused by network congestion and the current service can be implemented by means of pre-fetch, the QoS control entity may determine to use a service content buffering policy, which shall not be construed as any limitation on the present invention.

It should be understood that in various embodiments of the present invention, the sequence number of each process does not represent order of implementation, and the order of implementing the processes depends on their functions and inherent logic, and shall not constitute any limitation on the implementation process of the embodiments of the present invention.

Therefore, in the method for controlling network transmission delay in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

Figure 11:
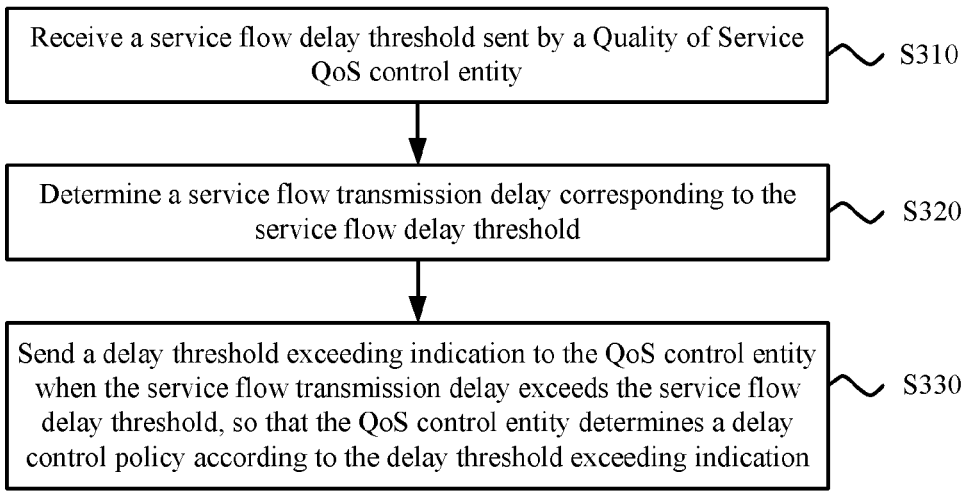
FIG. 11 is a schematic flowchart of a method for controlling network transmission delay according to another embodiment of the present invention.
Figure 12:
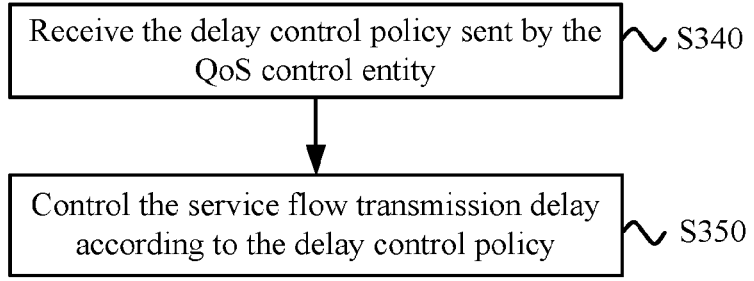
FIG. 12 is another schematic flowchart of a method for controlling network transmission delay according to another embodiment of the present invention.

The foregoing has described a method for controlling network transmission delay according to an embodiment of the present invention from a perspective of a QoS control entity with reference to FIG. 1 to FIG. 10, and the following describes a method for controlling network transmission delay according to an embodiment of the present invention from a perspective of a communication device with reference to FIG. 11 and FIG. 12.

FIG. 11 shows a method 300 for controlling network transmission delay according to another embodiment of the present invention. The method 300 may be executed by a communication device, such as a PGW or an eNB/RNC network device, or a user equipment UE. As shown in FIG. 11, the method 300 includes the following steps:

S310. Receive a service flow delay threshold sent by a Quality of Service QoS control entity.

S320. Determine a service flow transmission delay corresponding to the service flow delay threshold.

S330. Send a delay threshold exceeding indication to the QoS control entity when the service flow transmission delay exceeds the service flow delay threshold, so that the QoS control entity determines a delay control policy according to the delay threshold exceeding indication.

Therefore, in the method for controlling network transmission delay in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

In the embodiment of the present invention, as shown in FIG. 12, optionally, the method 300 may be executed by an eNB/RNC, and the method 300 further includes the following steps:

S340. Receive the delay control policy sent by the QoS control entity.

S350. Control the service flow transmission delay according to the delay control policy.

In S350, when the QoS control entity determines the flow switching policy as the delay control policy, the user equipment UE may initiate flow switching to the PGW according to the flow switching policy to control the transmission delay of the service flow. When the QoS control entity determines the service content buffering policy as the delay control policy, the eNB/RNC may buffer the service content over the service flow beforehand according to the flow switching policy, and transmit the service content to the user equipment to control the transmission delay of the service flow. When the QoS control entity determines the access technology switching policy as the delay control policy, the user equipment UE may access an accessible network in the location of the UE according to the flow switching policy to control the transmission delay of the service flow. When the QoS control entity determines the QoS update policy as the delay control policy, the network device PGW may update the IP-CAN bearer created with the UE according to the flow switching policy to control the transmission delay of the service flow.

In the embodiment of the present invention, optionally, the service flow delay threshold is a delay of the service content carried in the service flow from an application server to a user equipment as required by the application server. Optionally, the delay control policy includes: a flow switching policy, an access technology switching policy, a service content buffering policy, or a Quality of Service QoS update policy.

It should be understood that interaction between the QoS control entity and the communication device, relevant features and functions, and so on, which are described from the perspective of the communication device, correspond to those described from the perspective of the QoS control entity, and, for brevity, are not repeated here any further.

It should be understood that in various embodiments of the present invention, the sequence number of each process does not represent order of implementation, and the order of implementing the processes depends on their functions and inherent logic, and shall not constitute any limitation on the implementation process of the embodiments of the present invention.

Therefore, in the method for controlling network transmission delay in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

The foregoing has described in detail a method for controlling network transmission delay according to an embodiment of the present invention with reference to FIG. 1 to FIG. 12, and the following describes a QoS control entity and a communication device in detail according to an embodiment of the present invention with reference to FIG. 13 to FIG. 21.

Figure 13:
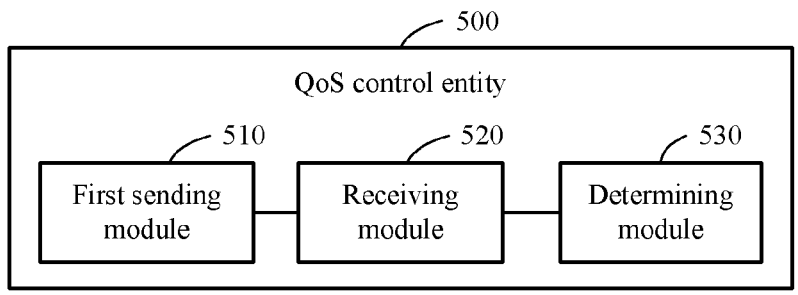
FIG. 13 is a schematic block diagram of a QoS control entity according to an embodiment of the present invention.

FIG. 13 is a schematic block diagram of a QoS control entity 500 according to an embodiment of the present invention. As shown in FIG. 13, the QoS control entity 500 includes:

a first sending module 510, configured to send a service flow delay threshold to a communication device according to a transmission delay requirement of a service flow, where the communication device includes a network device and/or a user equipment;

a receiving module 520, configured to receive a delay threshold exceeding indication sent by the communication device, where the delay threshold exceeding indication is used to indicate that a transmission delay of the service flow exceeds the service flow delay threshold sent by the first sending module 510; and a determining module 530, configured to determine a delay control policy according to the delay threshold exceeding indication received by the receiving module 520, so that the communication device that sends the delay control policy executes the delay control policy.

Therefore, with the QoS control entity in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

In the embodiment of the present invention, optionally, the delay control policy determined by the determining module 530 includes: a flow switching policy, an access technology switching policy, a service content buffering policy, or a Quality of Service QoS update policy.

In the embodiment of the present invention, optionally, the first sending module 510 is specifically configured to send the service flow delay threshold to the communication device according to the transmission delay requirement of the service flow, where the service flow delay threshold is a delay of the service content carried in the service flow from the application server to the user equipment as required by the application server.

Figure 14:
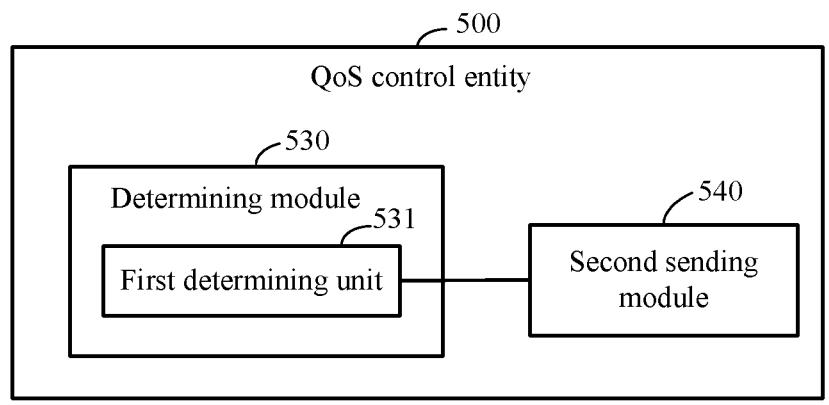
FIG. 14 is another schematic block diagram of a QoS control entity according to an embodiment of the present invention.

In the embodiment of the present invention, optionally, as shown in FIG. 14, the determining module 530 includes:
a first determining unit 531, configured to determine the flow switching policy as the delay control policy according to the delay threshold exceeding indication when the user equipment accesses at least two networks concurrently, where the indication is received by the receiving module 520; and the QoS control entity 500 further includes:
a second sending module 540, configured to send a flow switching indication to the user equipment according to the flow switching policy determined by the first determining unit 531, where the flow switching indication is used to instruct the user equipment to switch the service flow from a currently accessed network to another network in the at least two networks.

Figure 15:
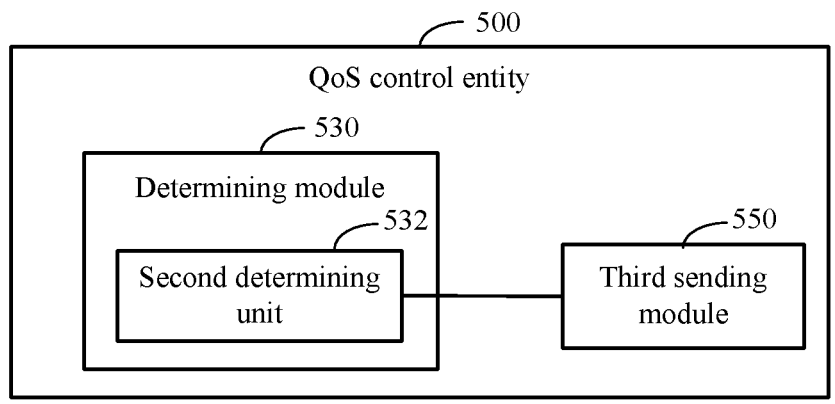
FIG. 15 is still another schematic block diagram of a QoS control entity according to an embodiment of the present invention.

In the embodiment of the present invention, optionally, as shown in FIG. 15, the determining module 530 includes:
a second determining unit 532, configured to determine the service content buffering policy as the delay control policy according to the delay threshold exceeding indication when the network device has a buffering capability, where the indication is received by the receiving module 520; and the QoS control entity 500 further includes:
a third sending module 550, configured to send a service content buffering indication to the network device according to the service content buffering policy determined by the second determining unit 532, where the service content buffering indication is used to instruct the network device to pre-buffer a service content carried in the service flow, whereupon the network device transmits the service content to the user equipment.

Figure 16:
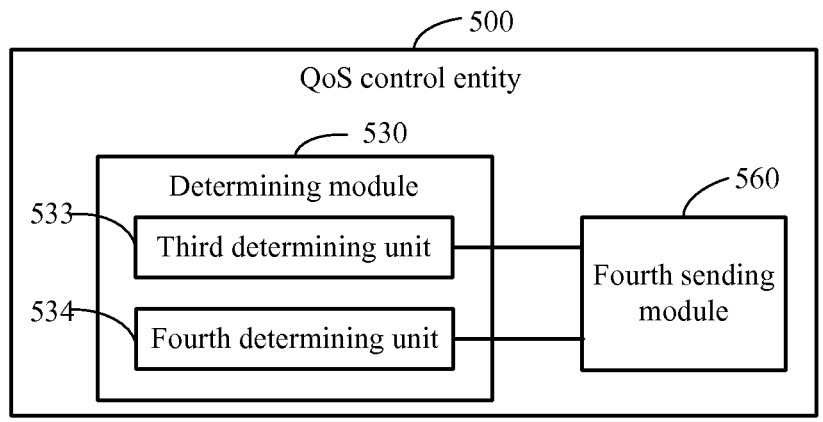
FIG. 16 is still another schematic block diagram of a QoS control entity according to an embodiment of the present invention.

In the embodiment of the present invention, optionally, as shown in FIG. 16, the determining module 530 includes:
a third determining unit 533, configured to determine an accessible network available in a location of the user equipment according to location information of the user equipment; and
a fourth determining unit 534, configured to determine the access technology switching policy as the delay control policy according to the delay threshold exceeding indication, where the indication is received by the receiving module 520; and the QoS control entity 500 further includes:

a fourth sending module 560, configured to send an access technology switching indication to the user equipment according to the access technology switching policy determined by the fourth determining unit 534, where the access technology switching indication is used to instruct the user equipment to access the accessible network determined by the third determining unit 533.

Figure 17:
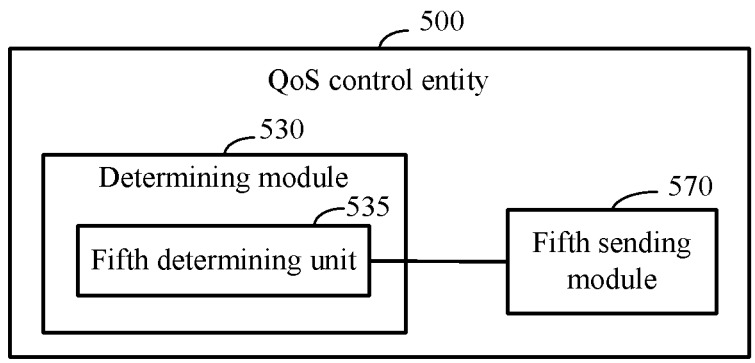
FIG. 17 is still another schematic block diagram of a QoS control entity according to an embodiment of the present invention.

In the embodiment of the present invention, optionally, as shown in FIG. 17, the determining module 530 includes:

a fifth determining unit 535, configured to determine the QoS update policy as the delay control policy according to the delay threshold exceeding indication when a network that includes the service flow can meet the transmission delay requirement, where the indication is received by the receiving module 520; and the QoS control entity 500 further includes:

a fifth sending module 570, configured to send a QoS update indication to the network device according to the QoS update policy determined by the fifth determining unit 535, where the QoS update indication is used to instruct the network device to update a QoS type identifier in the QoS policy.

In the embodiment of the present invention, the QoS control entity 500 may be a PCRF. For example, a PCRF in the PCC architecture shown in FIG. 1, or an open capability platform or a service development platform of the operator, and the QoS control entity may also be another open platform, which shall not be construed as any limitation on the present invention.

The QoS control entity 500 according to the embodiment of the present invention may correspond to a QoS control entity PCRF, an open capability platform, or the like, that is described in the embodiment of the present invention. The aforementioned and other operations and/or functions of each module in the QoS control entity 500 are intended for implementing the corresponding procedure in each method shown in FIG. 1 to FIG. 10, and, for brevity, are not detailed here any further.

Therefore, with the QoS control entity in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

Figure 18:
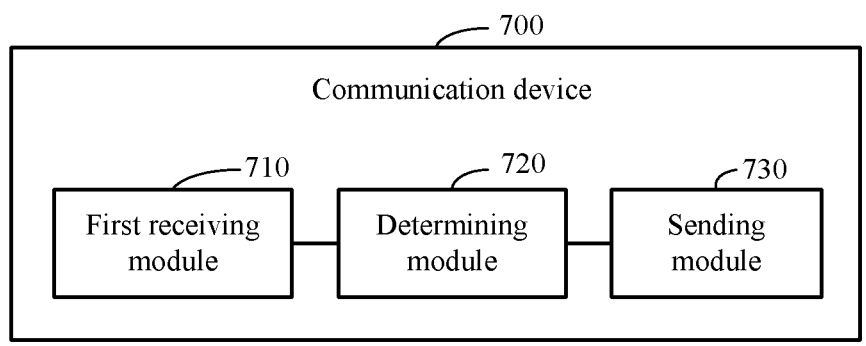
FIG. 18 is a schematic block diagram of a communication device according to an embodiment of the present invention.

FIG. 18 is a schematic block diagram of a communication device 700 according to an embodiment of the present invention. As shown in FIG. 18, the communication device 700 includes:

a first receiving module 710, configured to receive a service flow delay threshold sent by a Quality of Service QoS control entity;

a determining module 720, configured to determine a service flow transmission delay corresponding to the service flow delay threshold received by the first receiving module 710; and a sending module 730, configured to send a delay threshold exceeding indication to the QoS control entity when the service flow transmission delay determined by the determining module 720 exceeds the service flow delay threshold received by the first receiving module 710, so that the QoS control entity determines a delay control policy according to the delay threshold exceeding indication.

In the embodiment of the present invention, optionally, the first receiving module 710 is specifically configured to receive the service flow delay threshold sent by the QoS control entity, where the service flow delay threshold is a delay of the service content carried in the service flow from an application server to a user equipment as required by the application server.

Figure 19:
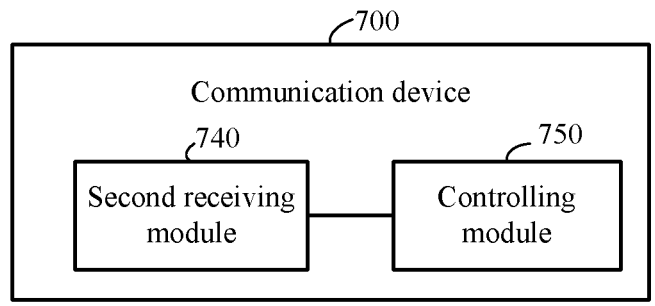
FIG. 19 is another schematic block diagram of a communication device according to an embodiment of the present invention.

Optionally, as shown in FIG. 19, the communication device 700 further includes:

a second receiving module 740, configured to receive the delay control policy sent by the QoS control entity; and a controlling module 750, configured to control the service flow transmission delay according to the delay control policy received by the second receiving module 740.

In the embodiment of the present invention, optionally, the delay control policy received by the second receiving module 740 includes: a flow switching policy, an access technology switching policy, a service content buffering policy, or a Quality of Service QoS update policy.

The communication device 700 according to the embodiment of the present invention may correspond to the communication device that includes a network device and a user equipment in the embodiments of the present invention, and aforementioned and other operations and functions of each module in the communication device 700 are intended for implementing the corresponding procedure in each method shown in FIG. 11 to FIG. 12, and, for brevity, are not detailed here any further.

Therefore, with the communication device in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

Figure 20:
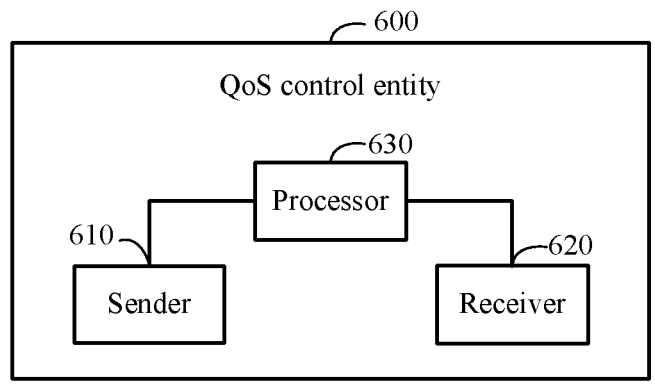
FIG. 20 is a schematic block diagram of a QoS control entity according to another embodiment of the present invention.

FIG. 20 is a schematic block diagram of a QoS control entity 600 according to another embodiment of the present invention. As shown in FIG. 20, the QoS control entity 600 includes: a sender 610, a receiver 620, and a processor 630.

The sender 610 is configured to send a service flow delay threshold to a communication device according to a transmission delay requirement of a service flow, where the communication device includes a network device and/or a user equipment.

The receiving module 620 is configured to receive a delay threshold exceeding indication sent by the communication device, where the delay threshold exceeding indication is used to indicate that a transmission delay of the service flow exceeds the service flow delay threshold sent by the sender 610.

The processor 630 is configured to determine a delay control policy according to the delay threshold exceeding indication received by the receiver 620, so that the communication device that sends the delay control policy executes the delay control policy.

Therefore, with the QoS control entity in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

In the embodiment of the present invention, optionally, the delay control policy determined by the processor 630 includes: a flow switching policy, an access technology switching policy, a service content buffering policy, or a Quality of Service QoS update policy.

In the embodiment of the present invention, optionally, the processor 630 is further configured to determine the flow switching policy as the delay control policy according to the delay threshold exceeding indication when the user equipment accesses at least two networks concurrently, where the indication is received by the receiver 620; and the sender 610 is further configured to send a flow switching indication to the user equipment according to the flow switching policy determined by the processor 630, where the flow switching indication is used to instruct the user equipment to switch the service flow from a currently accessed network to another network in the at least two networks.

In the embodiment of the present invention, optionally, the processor 630 is further configured to determine the service content buffering policy as the delay control policy according to the delay threshold exceeding indication when the network device has a buffering capability, where the indication is received by the receiver 620; and the sender 610 is further configured to send a service content buffering indication to the network device according to the service content buffering policy determined by the processor 630, where the service content buffering indication is used to instruct the network device to pre-buffer a service content carried in the service flow, whereupon the network device transmits the service content to the user equipment.

In the embodiment of the present invention, optionally, the processor 630 is further configured to determine an accessible network available in a location of the user equipment according to location information of the user equipment; and determine the access technology switching policy as the delay control policy according to the delay threshold exceeding indication received by the receiver 620; and the sender 610 is further configured to send an access technology switching indication to the user equipment according to the access technology switching policy determined by the processor 630, where the access technology switching indication is used to instruct the user equipment to access the accessible network determined by the processor.

In the embodiment of the present invention, optionally, the processor 630 is further configured to determine the QoS update policy as the delay control policy according to the delay threshold exceeding indication when a network that includes the service flow can meet the transmission delay requirement, where the indication is received by the receiver 620; and the sender 610 is further configured to send a QoS update indication to the network device according to the QoS update policy determined by the processor 630, where the QoS update indication is used to instruct the network device to update a QoS type identifier in the QoS policy.

In the embodiment of the present invention, optionally, the sender 610 is specifically configured to send the service flow delay threshold to the communication device according to the transmission delay requirement of the service flow, where the service flow delay threshold is a delay of the service content carried in the service flow from the application server to the user equipment as required by the application server.

Therefore, with the QoS control entity in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

Figure 21:
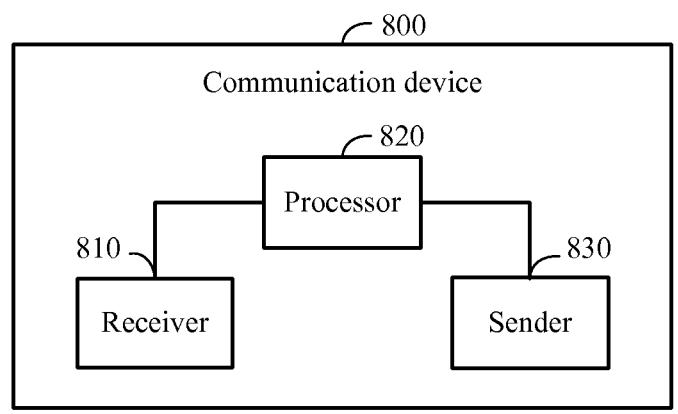
FIG. 21 is a schematic block diagram of a communication device according to another embodiment of the present invention.

FIG. 21 is a schematic block diagram of a communication device 800 according to another embodiment of the present invention. As shown in FIG. 21, the communication device 800 includes: a receiver 810, a processor 820, and a sender 830.

The receiver 810 is configured to receive a service flow delay threshold sent by a Quality of Service QoS control entity.

The processor 820 is configured to determine a service flow transmission delay corresponding to the service flow delay threshold received by the receiver 810.

The sender 830 is configured to send a delay threshold exceeding indication to the QoS control entity when the service flow transmission delay determined by the processor 820 exceeds the service flow delay threshold received by the receiver 810, so that the QoS control entity determines a delay control policy according to the delay threshold exceeding indication.

In the embodiment of the present invention, optionally, the receiver 810 is further configured to receive the delay control policy sent by the QoS control entity, and the processor 820 is further configured to control the transmission delay of the service flow according to the delay control policy received by the receiver 810.

In the embodiment of the present invention, optionally, the receiver 810 is specifically configured to receive the service flow delay threshold sent by the QoS control entity, where the service flow delay threshold is a delay of the service content carried in the service flow from an application server to a user equipment as required by the application server.

In the embodiment of the present invention, optionally, the delay control policy received by the receiver 810 includes: a flow switching policy, an access technology switching policy, a service content buffering policy, or a Quality of Service QoS update policy.

Therefore, with the communication device in the embodiment of the present invention, a service flow delay threshold is set to monitor the network transmission delay, and, when it is determined that the service flow transmission delay requirement is not met, a delay control policy is formulated to adjust the network transmission delay dynamically, thereby meeting end-to-end delay requirements of the service flow as far as possible and improving user experience.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units herein may be selected according to the actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any equivalent modification or replacement figured out by a person skilled in the art within the technical scope of the present invention shall fall within the protection scope of the present invention. Therefore, the protection scope of the present invention shall be subject to the protection scope of the claims.

What is claimed is:

1. A method for controlling network transmission delay, comprising:
    sending a service flow delay threshold to a communication device according to a transmission delay requirement of a service flow, wherein the communication device comprises a network device and/or a user equipment;
    receiving a delay threshold exceeding indication sent by the communication device, wherein the delay threshold exceeding indication is used to indicate that a transmission delay of the service flow exceeds the service flow delay threshold; and
    determining a delay control policy according to the delay threshold exceeding indication, so that the communication device that receives the delay control policy executes the delay control policy;
    wherein the determining a delay control policy according to the delay threshold exceeding indication comprises:
    determining a flow switching policy as the delay control policy according to the delay threshold exceeding indication when the user equipment accesses at least two networks concurrently; and the method further comprises: sending a flow switching indication to the user equipment according to the flow switching policy, wherein the flow switching indication is used to instruct the user equipment to switch the service flow from a currently accessed network to another network in the at least two networks; or
    determining an accessible network available in a location of the user equipment according to location information of the user equipment; determining an access technology switching policy as the delay control policy according to the delay threshold exceeding indication; and the method further comprises: sending an access technology switching indication to the user equipment according to the access technology switching policy, wherein the access technology switching indication is used to instruct the user equipment to access the accessible network.

2. A QoS control entity, comprising:
    a memory; and
    a processor coupled to the memory and configured to:
    send a service flow delay threshold to a communication device according to a transmission delay requirement of a service flow, wherein the communication device comprises a network device and/or a user equipment;
    receive a delay threshold exceeding indication sent by the communication device, wherein the delay threshold exceeding indication is used to indicate that a transmission delay of the service flow exceeds the service flow delay threshold; and
    determine a delay control policy according to the delay threshold exceeding indication, so that the communication device that receives the delay control policy executes the delay control policy; wherein the processor is further configured to:
    determine a flow switching policy as the delay control policy according to the delay threshold exceeding indication when the user equipment accesses at least two networks concurrently; and send a flow switching indication to the user equipment according to the flow switching policy, wherein the flow switching indication is used to instruct the user equipment to switch the service flow from a currently accessed network to another network in the at least two networks; or
    determine an accessible network available in a location of the user equipment according to location information of the user equipment; determine an access technology switching policy as the delay control policy according to the delay threshold exceeding indication; and send an access technology switching indication to the user equipment according to the access technology switching policy, wherein the access technology switching indication is used to instruct the user equipment to access the accessible network.

3. The QoS control entity according to claim 2, wherein the processor is further configured to send the service flow delay threshold to the communication device according to the transmission delay requirement of the service flow, wherein the service flow delay threshold is a delay of the service content carried in the service flow from an application server to the user equipment as required by the application server.

* * * * *